(12) United States Patent
Daniel

(10) Patent No.: US 9,649,919 B2
(45) Date of Patent: May 16, 2017

(54) OPEN BED VEHICLE COVER AND STORAGE SYSTEM

(71) Applicant: Michael Glenn Daniel, Dundee, OR (US)

(72) Inventor: Michael Glenn Daniel, Dundee, OR (US)

(73) Assignee: Truck Lidz, Inc., Dundee, OR (US)

( * ) Notice: Subject to any disclaimer, the term of this patent is extended or adjusted under 35 U.S.C. 154(b) by 0 days.

(21) Appl. No.: 14/595,040

(22) Filed: Jan. 12, 2015

(65) Prior Publication Data

US 2015/0321617 A1  Nov. 12, 2015

Related U.S. Application Data

(63) Continuation of application No. 13/105,256, filed on May 11, 2011, now Pat. No. 8,931,819.

(60) Provisional application No. 61/404,579, filed on Oct. 5, 2010.

(51) Int. Cl.
- *B60R 9/055* (2006.01)
- *B60P 7/02* (2006.01)
- *B60J 7/16* (2006.01)

(52) U.S. Cl.
CPC ............... *B60J 7/1621* (2013.01); *B60P 7/02* (2013.01); *B60R 9/055* (2013.01); *Y10T 29/49826* (2015.01); *Y10T 29/49828* (2015.01)

(58) Field of Classification Search
CPC .......... B60J 7/1621; B60P 7/02; B60R 9/055; Y10T 29/49826; Y10T 29/49828
See application file for complete search history.

(56) References Cited

U.S. PATENT DOCUMENTS 6,234,559 B1 * 5/2001 Block ................... B60J 7/1621
296/100.06

\* cited by examiner

*Primary Examiner* — Glenn Dayoan
*Assistant Examiner* — Melissa A Black

(57) ABSTRACT

Technologies and implementations related to open bed vehicle cover and storage systems are generally disclosed.

19 Claims, 11 Drawing Sheets

OPEN BED VEHICLE COVER AND STORAGE SYSTEM

CROSS-REFERENCE TO RELATED APPLICATIONS

This application is based upon and claims the benefit of priority to prior U.S. patent application Ser. No. 13/105,256 titled Open Bed Vehicle Cover and Storage System, filed on May 11, 2011 and now issued as U.S. Pat. No. 8,931,819, which in turn, is based upon and claims the benefit of priority to U.S. Provisional Application No. 61/404,579 titled Open Bed Vehicle Cover and Storage System, filed Oct. 5, 2010. Both, the U.S. patent application Ser. No. 13/105,256 and the U.S. Provisional Application No. 61/404,579, are incorporated herein in their entirety.

BACKGROUND

Unless otherwise indicated herein, the approaches described in this section are not prior art to the claims in this application and are not admitted to be prior art by inclusion in this section.

Open bed vehicles such as trucks have a cabin portion for passengers and a rear portion known as a bed for storage and hauling cargo. The bed portion of the vehicle is open to the elements such as rain, snow, sunlight and wind. Since some vehicle owners do not wish to have their beds exposed to the elements or desire security for their cargo, the bed portions of these open bed vehicles may be covered by bed covers.

There are two general classes of bed covers, soft bed covers and hard bed covers. Soft bed covers are typically easier than hard bed covers to attach or detach but do not offer the security of a hard cover. Hard covers typically provide for security. However, they may not allow for easy removal or easy access to the front portion of the vehicle bed. To get to items stored in the front of the vehicle bed the owner must climb into the vehicle bed and crawl under the vehicle bed cover.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
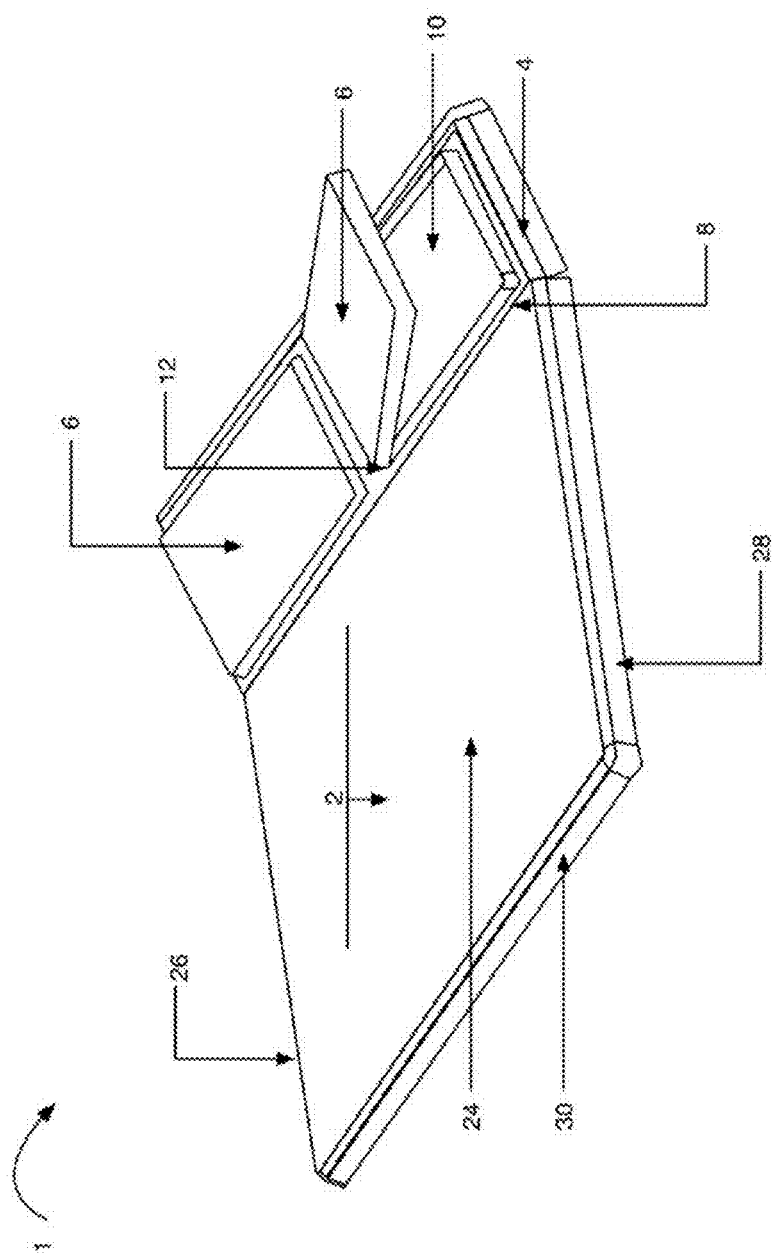
FIG. 1 is an illustration of an example bed vehicle cover and storage system.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting.

This disclosure is drawn, inter alia, to apparatus, systems and methods related to cover and storage systems for open bed vehicles.

In various examples, open bed vehicle cover and storage systems are enclosed. In some examples, a system may include a storage frame that may be affixed at a front portion of an open bed of a vehicle (i.e., in the open bed of the vehicle and adjacent to the vehicle cab). The storage frame may be configured to receive a storage compartment such that the storage compartment may be removably coupled within the storage frame. When in a stored position, the storage compartment may be housed within the storage frame. A storage lid affixed to the storage from may provide access to the storage compartment when the storage compartment is in the stored position. A bed cover may be removably coupled to a male rail hinge. The male rail hinge may include a bracket portion attached to a bed rail of the vehicle and a coupling portion that may accept a female hinge. The bed cover may be coupled to the male rail hinge by a female hinge affixed to the bed cover. The male rail hinge may be positioned substantially adjacent to the edge of the storage frame that is opposite the cab of the vehicle such that, when the bed cover is coupled to the male rail hinge, the bed cover is adjacent to the storage frame. When in a closed position, the bed cover may extend over a channel of the storage frame and over the vehicle bed rail to the vehicle tailgate. The bed cover may protect materials stored in the open bed from the elements and/or keep materials secure when driving.

The open bed vehicle cover and storage systems discussed herein may offer the advantages of flexibility and ease of use. The bed cover may be rotated between open and closed positions (in some examples with the aid of a shock) such that materials may be easily stored and removed. Further, the bed cover may be removed to provide a greater clearance for large objects and to provide easier access to the storage compartment. Access to the storage compartment may be achieved through a storage lid or the storage compartment may be removed. Removal of the storage compartment may provide for easy transport of materials to and from the vehicle. Further, removal of the storage compartment may provide for a larger area of access to the vehicle bed. The storage frame may remain affixed to the vehicle such that the other components (i.e., the storage compartment and the bed cover) may be coupled in any desired configuration.

FIG. 1 is an illustration of an example bed vehicle cover and storage system, arranged in accordance with at least some embodiments of the present disclosure. As shown in FIG. 1, an open bed vehicle cover and storage system 1 may include a storage frame 4 and a bed cover 2 that may include an upper surface 24, an edge 26, an edge 28, an attachment edge 8, and a rear edge 30. System 1 may also include storage lids 6 affixed to storage frame 4 at attachment area 12. Storage lids 6 may provide access to a removable storage compartment 10, as is further discussed herein. As shown in FIG. 1, in some examples, two hinged storage lids 6 may be provided in a gull wing configuration. In other examples, a single storage lid or three or more storage lids may be provided. In various examples, the storage lids may be hinged lids, sliding storage lids or removable storage lids. As will be discussed further herein, bed cover 2 may be removably coupled to storage frame 4 and, when coupled, may be moved between an open position and a closed position.

In general, the components of FIG. 1 and those discussed herein may include any suitable material or materials. In some examples, the components may include fiberglass, a composite plastic or plastics, or fiber reinforced plastics. The components may include the same materials or they may be different.

Figure 2:
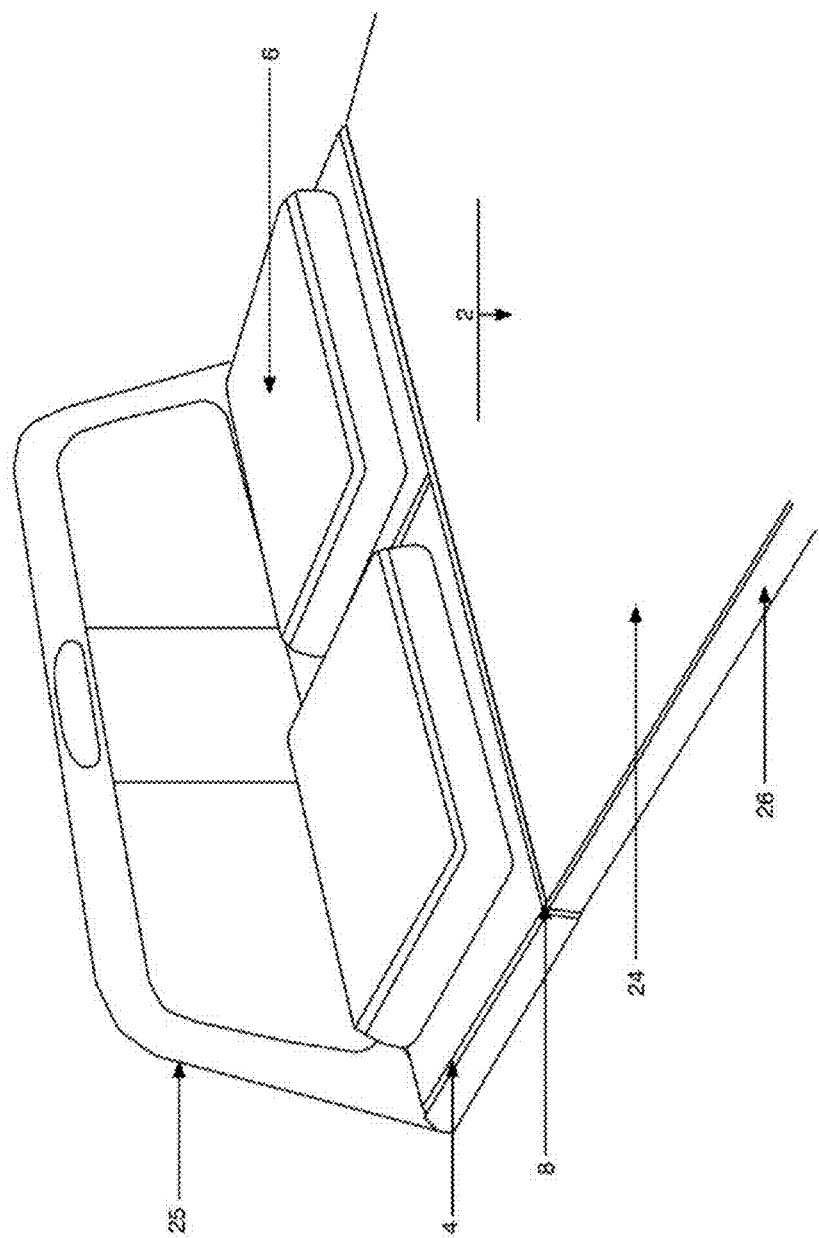
FIG. 2 is an illustration of an example bed vehicle cover and storage system.

FIG. 2 is an illustration of an example bed vehicle cover and storage system, arranged in accordance with at least some embodiments of the present disclosure. As shown in FIG. 2, open bed vehicle cover and storage system 1 may be installed on a vehicle 25. In an example, storage frame 4 may be affixed at a front portion of an open bed of vehicle 25 (i.e., adjacent to the cab of vehicle 25). As will be discussed further herein, a storage compartment may be removably coupled to storage frame 4 such that storage lids 6 provide access to the storage compartment when the storage compartment is in a stored position.

Bed cover 2 may be coupled to storage frame 4 such that bed cover 2 is both removable from storage frame 4 and rotatable when coupled to storage frame 4. As shown in FIG. 2, when in a closed position, bed cover 2 may cover at least a portion of the open bed of vehicle 30. In some examples, in the closed position, bed cover 2 may cover substantially all of the open bed of vehicle 30 such that bed cover 2 extends to a tailgate of vehicle 30. Bed cover 2 may be substantially aligned with storage frame 4 such that they may appear to be a single unit. Storage lids 6 may fit securely over storage frame 4 to provide a substantially water proof seal. As shown in FIG. 2, storage frame 4 and bed cover 2 may be configured and installed such that a portion of each extend over the bed rails of vehicle 25 (including edge 26 of bed cover 2). Such a configuration may provide protection for the open bed of vehicle 25 and for support for storage frame 4 and bed cover 2 that may provide safety and limited shifting of components while driving vehicle 25. In general, vehicle 25 may include any suitable vehicle having an open bed configuration such as, for example, pick up trucks, open bed coupe utility vehicles, or the like.

As described, storage frame 4 may be affixed to vehicle 25. In such a manner, storage frame 4 may be considered integrated to vehicle 25, such that storage frame 4 may not be easily removed after being affixed. In contrast, bed cover 2 and storage compartment 10 may be considered removable and detachable from storage frame 4. In general, the components discussed may be modified to fit any open bed vehicle by properly sizing the components. Further, while the illustrated configurations show a storage frame covering a fraction of the open bed (such as, for example, about 25% of the open bed), the storage frame may be made larger or smaller to suit. In general, bed cover 2 may extend to the end of the open bed to the tailgate of the vehicle. However, in some examples, bed cover 2 may extend to a point of the open bed short of the tailgate, which may suit particular applications such as leaving room for a tall piece of equipment. In such examples, bed cover 2 may include an end portion which may extend down from edge 30 to contact the open bed of the vehicle to provide protection to the bed and materials stored therein.

Figure 3:
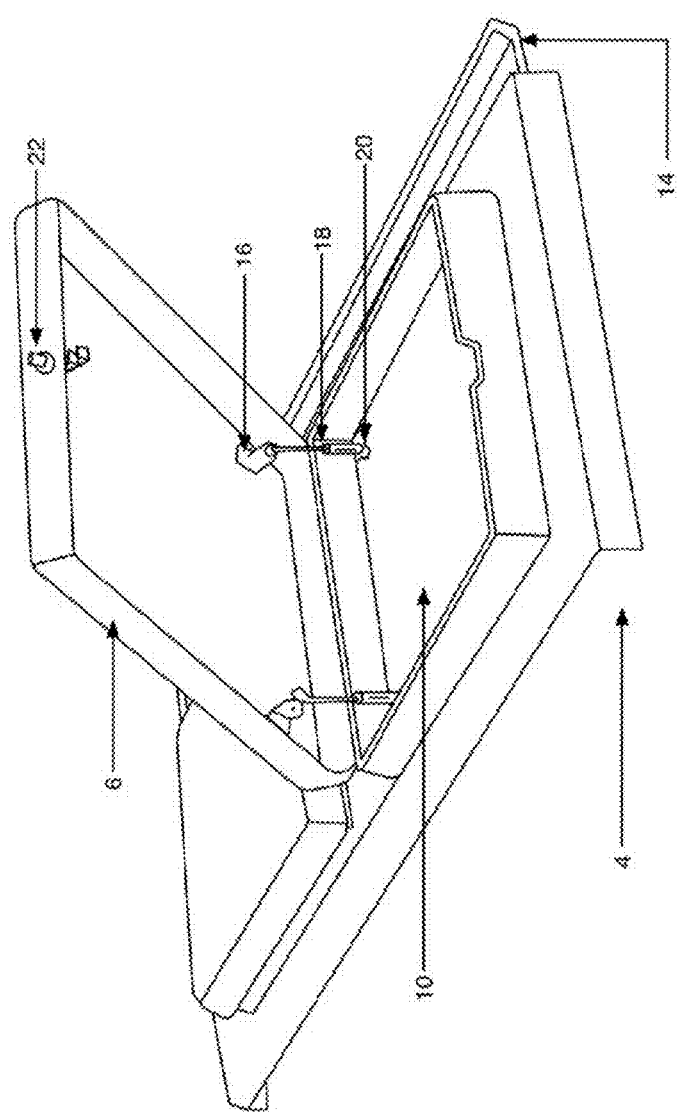
FIG. 3 is an illustration of example storage lids and an example storage compartment.

FIG. 3 is an illustration of example storage lids and an example storage compartment, arranged in accordance with at least some embodiments of the present disclosure. As shown in FIG. 3, storage frame 4 may include an attachment channel 14. Attachment channel 14 may facilitate attachment of bed cover 2 such that a portion of bed cover 2 extends over attachment channel 14, as is discussed further herein. In some examples, attachment channel 14 may also provide a drain such that water or other liquids may accumulate in and/or drain from attachment channel 14. Such draining may maintain a relatively dry bed area of vehicle 25 and protection of materials stored therein. FIG. 3 also illustrates an optional shock 18 mounted using mounting brackets 16, 20. Shock 18 may be affixed to the storage lid and the storage frame to facilitate moving the storage lid between an open position and a closed position. Shock 18 may provide a relatively easy and smooth lift of storage lid 6. As shown in FIG. 3, in some examples each storage lid 6 may be outfitted with two shocks. In some examples, a single shock per storage lid may be used. FIG. 3 also illustrates an optional lock 22. Lock 22 may provide security for the storage compartment. FIG. 3 illustrates hinged storage lids 6 in a gull wing configuration. As will be appreciated, an optional shock and/or optional lock may be provided on a single lid configuration. Further, an optional lock may be provided on sliding lid or removable lid configurations.

Figure 4:
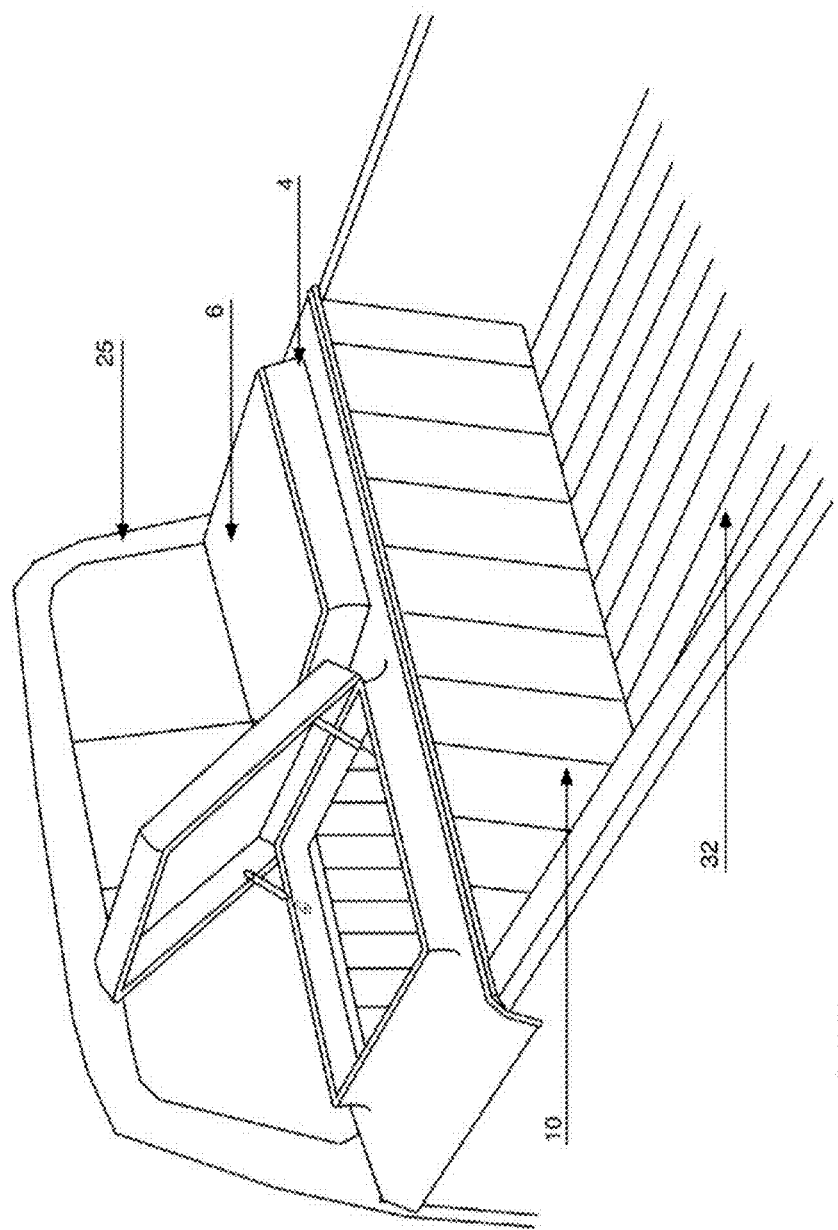
FIG. 4 is an illustration of example storage lids, an example storage frame and an example storage compartment.

FIG. 4 is an illustration of example storage lids, an example storage frame and an example storage compartment, arranged in accordance with at least some embodiments of the present disclosure. As shown in FIG. 4, storage frame 4 may be affixed at a front portion of a vehicle bed 32. FIG. 4 illustrates open bed vehicle cover and storage system with the bed cover removed. As shown in FIG. 4, storage compartment 10 may be housed within storage frame 4 when in a stored position. Such positioning may allow access to storage compartment 10 via storage lids 6 when storage compartment 10 is in the stored position. FIG. 4 also illustrates that when the bed cover is removed, vehicle bed 32 may be easily accessible while the open bed vehicle cover and storage system provides removable storage using storage compartment 10. As shown in FIG. 4, storage compartment 10 may set within or underneath the storage frame 4 and may be easily accessible by storage lids 6. FIG. 4 also illustrates that storage compartment 10 is separate from the vehicle bed 32 and may be removable. As shown in FIG. 4, in some examples storage compartment 10 may be a single bin. In other examples, storage compartment may have several bins and sub-compartments and the like. In some examples, storage compartment 10 may include a first bin and a second bin such that the first bin is accessible by one storage lid and the second bin is accessible by a second storage lid. Such a configuration may offer ease of use such that stored materials or components may substantially stay on one side of vehicle 25 and may not shift during the driving of vehicle 25. In some examples, storage compartment 10 may be held in place by friction between the illustrated components. In other examples, a physical securement may be used such as for example, magnets, a pin and latch mechanism, or the like.

Figure 5:
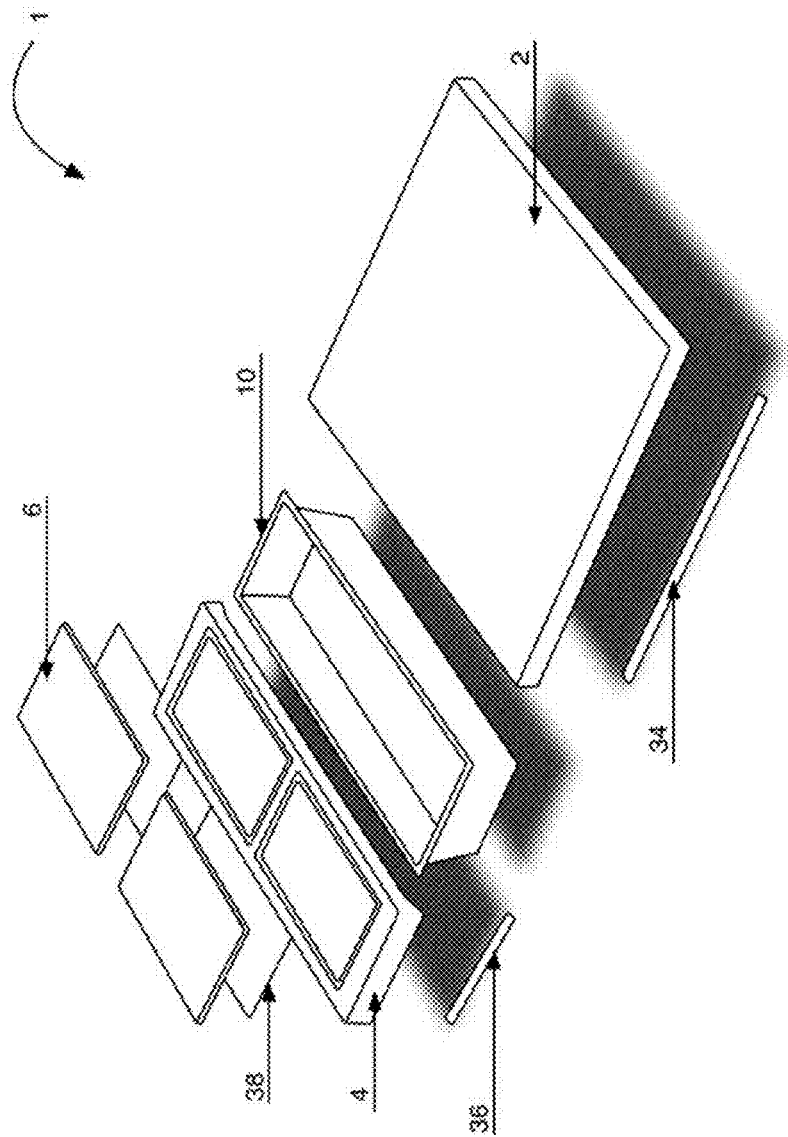
FIG. 5 is an exploded view illustration of an example bed vehicle cover and storage system.

FIG. 5 is an exploded view illustration of an example bed vehicle cover and storage system, arranged in accordance with at least some embodiments of the present disclosure. As shown in FIG. 5, open bed vehicle cover and storage system 1 may include stripping 34, 36, 38. In general, stripping 34, 36, 38 may include any suitable stripping to provide a seal between the illustrated components. Stripping 34, 36, 38 may provide a proper fit between the shown components during installation and use. Stripping 34 may provide a seal between bed cover 2 and the vehicle bed rail. Stripping 36 may provide a seal between storage frame 4 and the vehicle bed rail. Stripping 38 may provide a seal between storage lids 6 and storage frame 4. Stripping 34, 36, 38 may also provide a proper fit between the shown components during installation and use.

Figure 6:
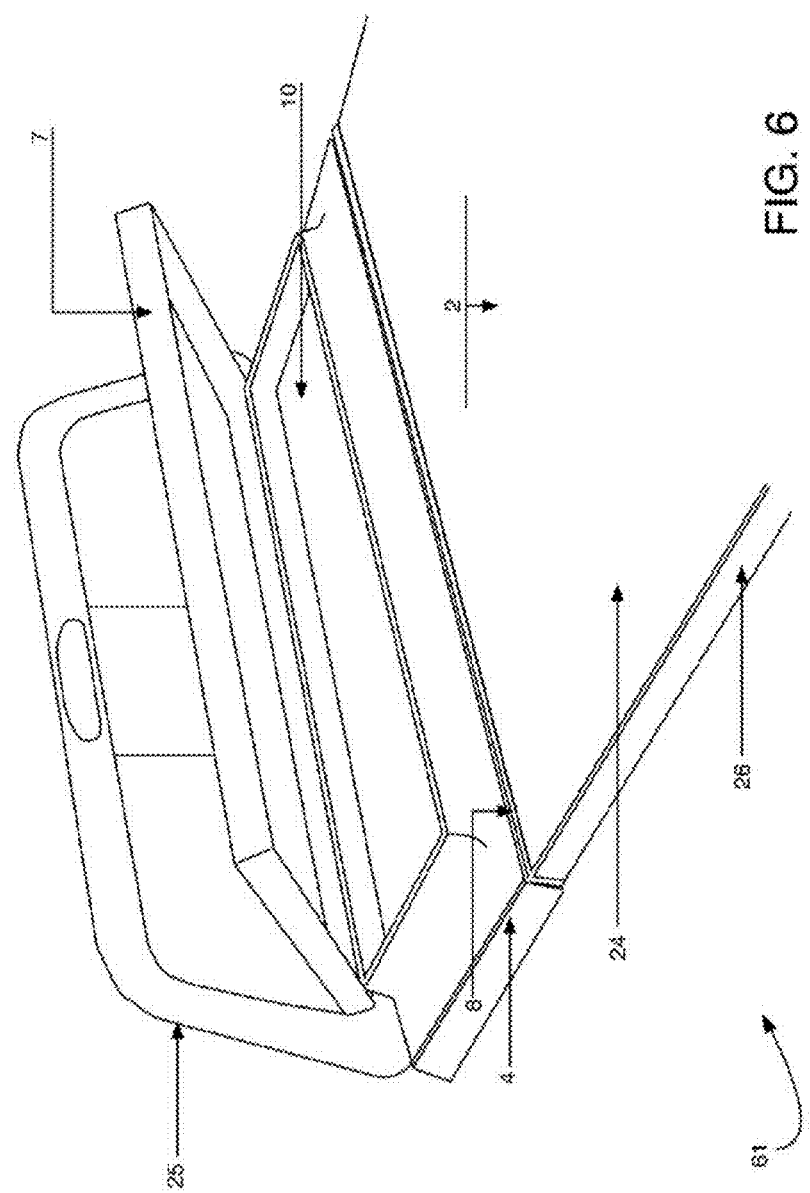
FIG. 6 is an illustration of an example bed vehicle cover and storage system.

FIG. 6 is an illustration of an example bed vehicle cover and storage system, arranged in accordance with at least some embodiments of the present disclosure. As shown in FIG. 6, in some examples, an open bed vehicle cover and storage system 61 may include a single storage lid 7 that may extend substantially across the bed of vehicle 25. Such a configuration may offer the advantage of allowing larger objects to be placed into the bed or storage compartment, for example. Open bed vehicle cover and storage system 61 may otherwise include any of the components discussed with respect to any of the systems discussed herein.

Figure 7:
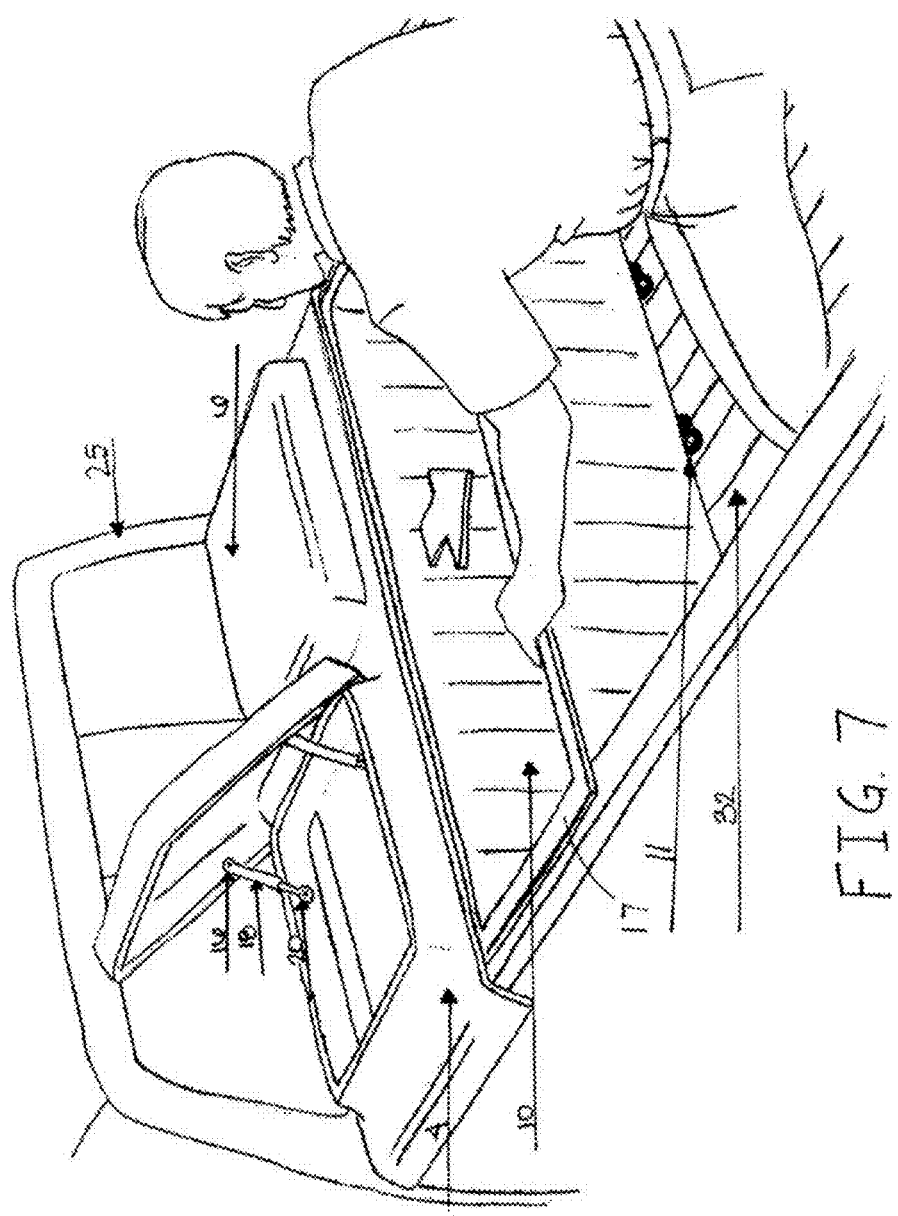
FIG. 7 is an illustration of an in use example of storage lids, an example storage frame and an example storage compartment.

FIG. 7 is an illustration of an in use example of storage lids, an example storage frame and an example storage compartment, arranged in accordance with at least some embodiments of the present disclosure. As shown in FIG. 7, storage compartment 10 may be removable from storage frame 4 and configured to be housed within the storage frame when in a stored position. As shown, in some examples storage compartment 10 may include a lip 17 that may extend over the vehicle bed rail of vehicle 25. In other examples, storage compartment may not include a lip. In some examples, storage compartment 10 may include a wheel or wheels or a slide or slides to facilitate removal or insertion of storage compartment 10 within storage frame 4 and vehicle bed 32. Such configurations may be advantageous when a heavy load is held in storage compartment 10 during its removal. In some examples, storage compartment 10 may include a handle or handles to facilitate removal. As illustrated, when storage compartment 10 is removed, storage frame 4 and storage lids 6 may remain attached to vehicle 25 for continued use.

Figure 8:
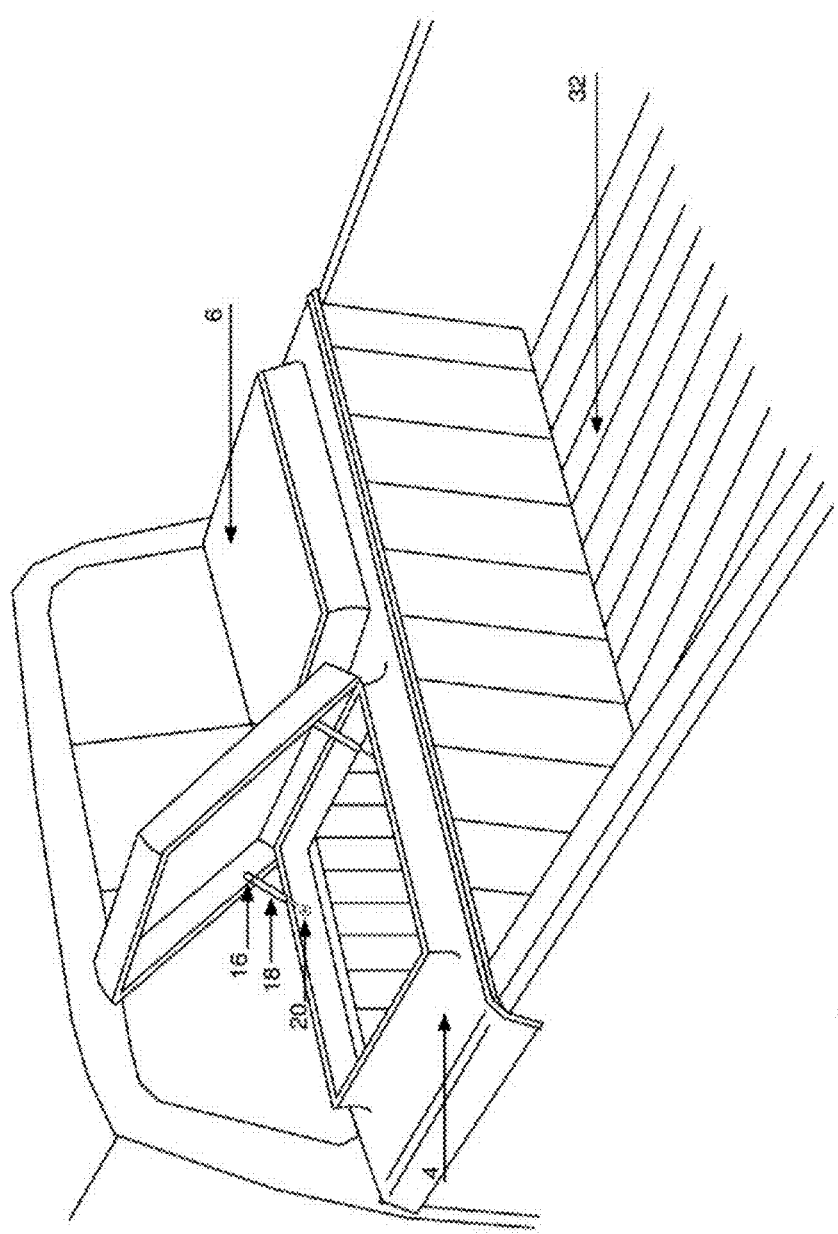
FIG. 8 is an illustration of example storage lids and an example storage compartment.

FIG. 8 is an illustration of example storage lids and an example storage compartment, arranged in accordance with at least some embodiments of the present disclosure. As shown in FIG. 8, when storage compartment 10 and bed cover 2 are removed, the open bed vehicle cover and storage systems discussed herein may provide access to a substantial portion of vehicle bed 32 with storage frame 4 and storage lids 6 remaining in place. In such a configuration, storage frame 4 and the storage lids 6 may remain attached to vehicle bed 32 to allow for full open use of substantially all of the open bed.

Figure 9:
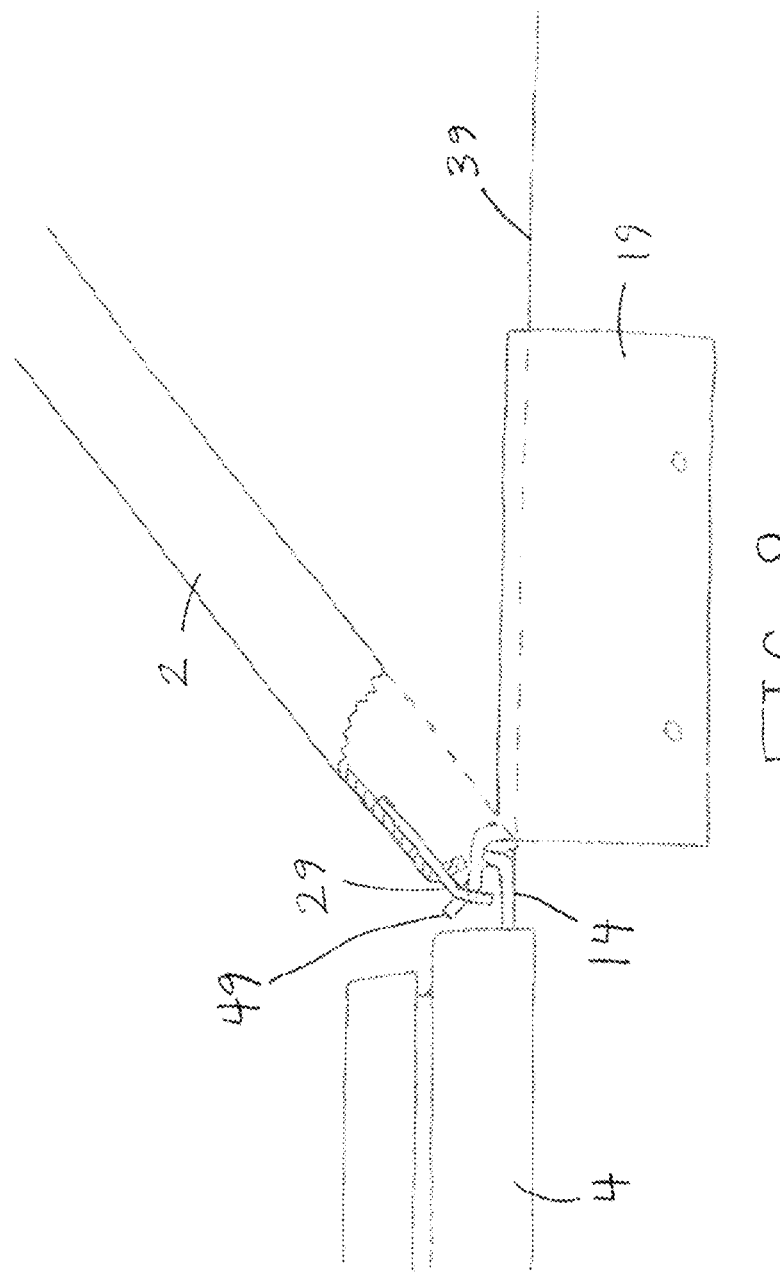
FIG. 9 is an illustration of an example coupling of a storage frame and a storage lid in an open position.

FIG. 9 is an illustration of an example coupling of a storage frame and a storage lid in an open position, arranged in accordance with at least some embodiments of the present disclosure. As shown in FIG. 9, a male rail hinge 19 may be affixed to a bed rail 39 of the open bed of the vehicle. Male rail hinge 19 may be affixed adjacent storage frame 4 and such that a portion of male rail hinge 19 overlaps attachment channel 14. Male rail hinge 19 may be affixed in any suitable manner such as, for example, by a tightened clamp or by being bolted or the like. Male rail hinge 19 may include any suitable material or materials, such as, for examples, a metal, a hardened plastic, a fiberglass, a composite plastic, or a fiber reinforced plastic. Male rail hinge 19 may include a coupling portion 49 for coupling to a female hinge 29 which may be affixed to bed cover 2. Female hinge 29 may be affixed to bed cover 2 in any suitable manner such as, for example, by adhesive or by bolting, or the like. Female hinge 29 may include any suitable material or materials, such as, for examples, a metal, a hardened plastic, a fiberglass, a composite plastic, or a fiber reinforced plastic. In some examples, female hinge 29 may be integral to bed cover 2 such that they are substantially the same piece of material.

As illustrated, bed cover 2 may be removably coupled to the male rail hinge and configured to be rotatable when in the coupled position. Also as illustrated, bed cover 2 may be configured to be coupled with storage frame 4 adjacent to attachment channel 14. In some examples, attachment channel 14 may provide alignment and coupling for bed cover 2. As illustrated in FIG. 9, in some examples, storage frame 4 and male rail hinge 19 may be separate components. In other examples, storage frame 4 and male rail hinge 19 may be integrated components by being welded, being bolted, or being a continuous material. In some examples, coupling portion 49 may include a through hole for receiving a retaining pin or clip. Such a configuration may offer added safety to the coupling of bed cover 2.

Figure 10:
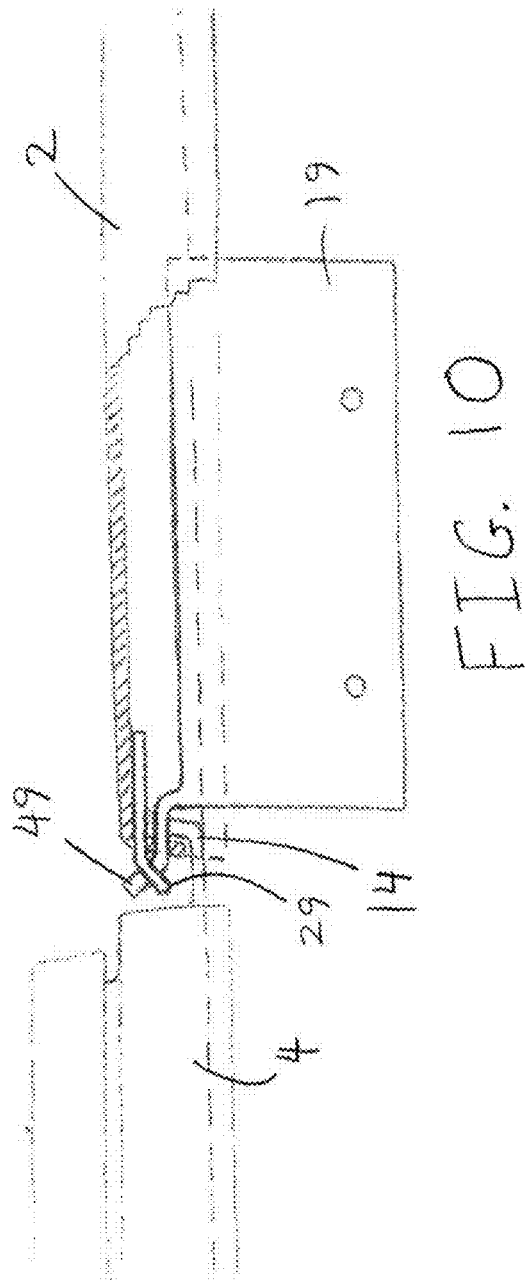
FIG. 10 is an illustration of an example coupling of a storage frame and a storage lid in a closed position.

FIG. 10 is an illustration of an example coupling of a storage frame and a storage lid in a closed position, arranged in accordance with at least some embodiments of the present disclosure. As illustrated in FIG. 10, bed cover 2 may be rotated to a closed position when in the coupled position. In the closed position, a portion of bed cover may extend over attachment channel 14. Such a configuration may provide a cover from the elements and alignment of bed cover 2. Also as illustrated and as discussed herein, when in the closed position, bed cover 2 may cover at least a portion of the open bed of the vehicle. In some examples, moving bed cover 2 between the open position of FIG. 9 and the closed position of FIG. 10 may be aided by a shock. The shock may be a affixed to the bed cover and may extend into contact with the bed rail such that it may extend between them. In some examples, two shocks may be provided with one installed on each side of the vehicle and bed cover.

Figure 11:
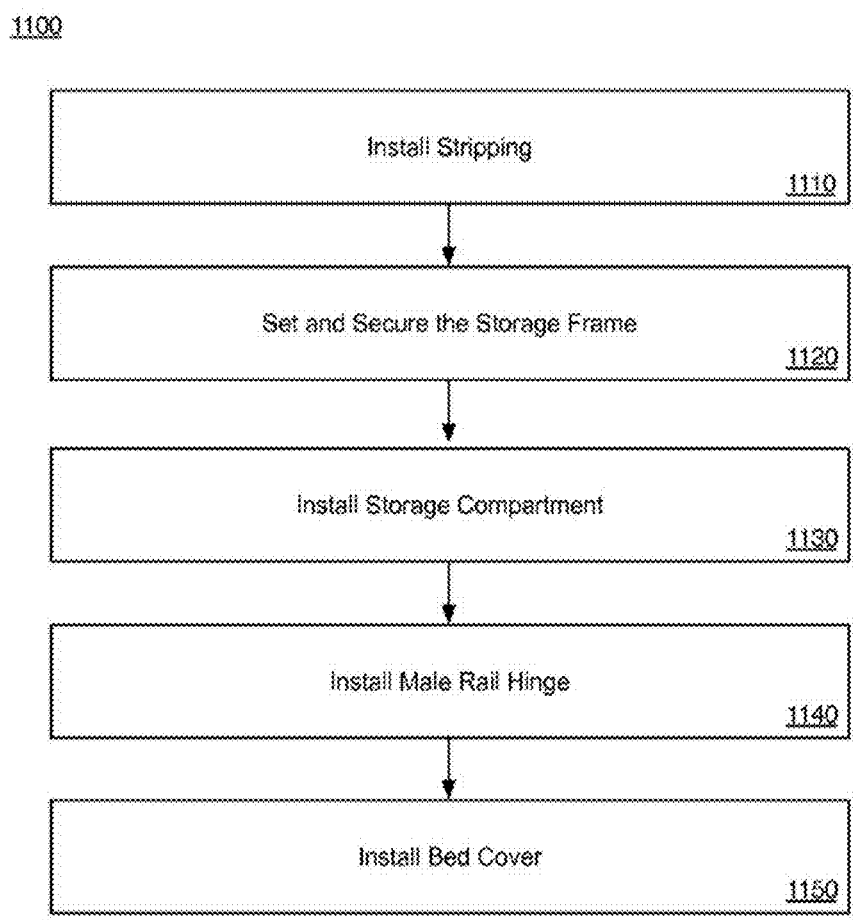
FIG. 11 is an illustration of an example method for installing a bed vehicle cover and storage system, all arranged in accordance with at least some embodiments of the present disclosure.

FIG. 11 is an illustration of an example method 1100 for installing a bed vehicle cover and storage system, arranged in accordance with at least some embodiments of the present disclosure. Method 1100 may include one or more functions, operations or actions as illustrated by one or more of blocks 1110, 1120, 1130, 1140, and/or 1150. In some examples, pre-steps for protecting the installation vehicle may be taken such as applying masking tape on the vehicle bed rails and tailgate to avoid accidental paint damage and/or cleaning the installation surfaces.

The process of method 1100 may begin at block 1110. At block 1110, stripping may be installed. The stripping may include stripping 34, 36, 38 discussed herein and may include any weather seal or gasket or the like. In general, the stripping may be properly aligned and placed at or near the storage frame edges. The method may continue at block 1120.

At block 1120, the storage frame may be set and secured at the front of the open bed of the vehicle adjacent to the cab of the vehicle. The installed storage frame may include any of the storage frames discussed herein. In general, the storage frame should be aligned side to side and aligned such that the frame is substantially flush with the front edge of the open bed vehicle bed. The storage frame may be secured using clamps. The clamps may be held under the open bed vehicle bed rail and a bolt (i.e., a ⅜" bolt) may be slid through a bracket of the clamp on the cab side of the storage frame. The bolt may be thread into the bed rail clamps and hand tightened (to be fully tightened later). The method may continue at block 1130.

At block 1130, the storage compartment may be installed. The installed storage compartment may include any of the storage frames discussed herein. The storage compartment may be slid under the secondary storage compartment frame such that the sides of the storage compartment may be substantially aligned over the vehicle bed rails. Also, the storage frame may optionally be further secured using clamps and bolts as discussed with respect to block 1120 for the remainder of the installation (to be removed when complete). The method may continue at block 1140.

At block 1140, the male rail hinge may be installed. The installed male rail hinge may include any of the storage frames discussed herein. A first male rail hinge may be placed on top of the vehicle bed rail and aligned attachment channel of the storage frame. A clamp may be placed behind the bed rail and a bolt (i.e., a ¼" bolt) may be slid through the male rail hinge and tightened. The method may be repeated for a second male rail hinge on the opposite vehicle bed rail. The method may continue at block 1150.

At block 1150, the bed cover may be installed. The installed bed cover may include any of the storage frames discussed herein. The bed cover may be lifted (preferably using a safe two person lift) onto the vehicle bed rails and on the open bed. A female hinge affixed to the bed cover may be placed over the male rail hinge and an optional retaining clip may be inserted through an optional hole on the end of the male rail hinge portion configured to secure the female hinge of the bed cover. The bed cover may be held in an open position to place the female hinge over the male rail hinge portion on one side of the vehicle and the procedure may be repeated on the other side of the vehicle. An optional bed cover shock may be adjusted to prevent flexing of the bed cover and to provide ease of use in the open bed cover position. With the tailgate of the vehicle open, the bed cover may be closed and checked for alignment.

The described methods may provide for the installation of any of the open bed vehicle cover and storage systems discussed herein on any suitable vehicle.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A modular rearrangeable self-contained open bed vehicle cover and storage system comprising:
   a rearrangeable storage frame configured to be placed at a front portion of an open bed of a vehicle;
   a rearrangeable storage compartment couplable to the rearrangeable storage frame and configured to be housed within the rearrangeable storage frame when in a stored position;
   a rearrangeable storage lid couplable to the rearrangeable storage frame and configured to provide access to the rearrangeable storage compartment when the rearrangeable storage compartment is in the stored position;
   a male rail hinge configured to be affixed to a bed rail of the open bed of the vehicle and adjacent to the rearrangeable storage frame; and
   a rearrangeable bed cover couplable to the male rail hinge and configured to be rotatable when in a coupled position, the rearrangeable bed cover is configured to be coupled with the rearrangeable storage frame and to cover at least a portion of the open bed of the vehicle when in a closed position, wherein the rearrangeable storage frame, the rearrangeable storage compartment, the rearrangeable storage lid, and the rearrangeable bed cover are configured to be easily rearrangeable as a single combined unit or as a one or more of individual units within the open bed of the vehicle.

2. The modular rearrangeable self-contained open bed vehicle cover and storage system of claim 1, wherein the rearrangeable bed cover is couplable to the male rail hinge by a female hinge affixed to the rearrangeable bed cover being coupled to the male rail hinge.

3. The modular rearrangeable self-contained open bed vehicle cover and storage system of claim 1, wherein the male rail hinge and the rearrangeable storage frame are integrated components.

4. The modular rearrangeable self-contained open bed vehicle cover and storage system of claim 3, wherein the male rail hinge and the rearrangeable storage frame are integrated by at least one of being welded, being bolted, or being a continuous material.

5. The modular rearrangeable self-contained open bed vehicle cover and storage system of claim 1, wherein the rearrangeable storage lid comprises at least one of a hinged lid, a sliding lid, or a removable lid.

6. The modular rearrangeable self-contained open bed vehicle cover and storage system of claim 1, further comprising:
   a rearrangeable second storage lid couplable to the rearrangeable storage frame, wherein the rearrangeable storage lid and the rearrangeable second storage lid are hinged rearrangeable storage lids in a gull wing configuration.

7. The modular rearrangeable self-contained open bed vehicle cover and storage system of claim 6, wherein the rearrangeable storage compartment comprises a rearrangeable first bin and a rearrangeable second bin such that the rearrangeable first bin is accessible by the rearrangeable storage lid and the rearrangeable second bin is accessible by the second rearrangeable storage lid.

8. The modular rearrangeable self-contained open bed vehicle cover and storage system of claim 1, wherein the rearrangeable storage lid comprises at least one of a fiberglass, a composite plastic, or a fiber reinforced plastic.

9. The modular rearrangeable self-contained open bed vehicle cover and storage system of claim 1, further comprising:
a shock removably couplable to the rearrangeable storage lid and the rearrangeable storage frame to facilitate moving the storage lid between an open position and a closed position.

10. The modular rearrangeable self-contained open bed vehicle cover and storage system of claim 1, further comprising:
a shock removably couplable to the rearrangeable bed cover and a bed rail of the open bed of the vehicle to facilitate moving the bed cover between an open position and the closed position.

11. The modular rearrangeable self-contained open bed vehicle cover and storage system of claim 1, wherein the rearrangeable storage lid comprises a lock to provide security for the rearrangeable storage compartment.

12. A method for installing a modular rearrangeable self-contained open bed vehicle cover and storage system comprising
placing a rearrangeable storage frame to a front portion of an open bed of a vehicle;
coupling a rearrangeable storage compartment within the rearrangeable storage frame, wherein the rearrangeable storage compartment is accessible via a rearrangeable storage lid, the rearrangeable storage lid being removably couplable to the rearrangeable storage frame;
affixing a male rail hinge to a bed rail of the open bed of the vehicle and adjacent to the rearrangeable storage frame; and
coupling a rearrangeable bed cover to the male rail hinge such that the rearrangeable bed cover is adjacent to the rearrangeable storage frame and at least a portion of the open bed of the vehicle is covered by the rearrangeable bed cover when the rearrangeable bed cover is in a closed position, wherein the rearrangeable storage frame, the rearrangeable storage compartment, the rearrangeable storage lid, and the rearrangeable bed cover are configured to be easily rearrangeable as a single combined unit or as one or more of individual units within the open bed of the vehicle.

13. The method of claim 12, further comprising:
providing a weather seal between the rearrangeable storage frame and a portion of the vehicle.

14. The method of claim 12, wherein placing the rearrangeable storage frame comprises placing the rearrangeable storage frame immediately adjacent to a cab of the vehicle.

15. The method of claim 12, wherein placing the rearrangeable storage frame comprises securing the rearrangeable storage frame by clamps.

16. The method of claim 12, wherein coupling the rearrangeable bed cover to the male hinge comprises coupling a female hinge affixed to the rearrangeable bed cover to a coupling portion of the male rail hinge.

17. The method of claim 12, wherein coupling the rearrangeable bed cover comprises extending a portion of the rearrangeable bed cover over an attachment channel of the rearrangeable storage frame.

18. The method of claim 12, wherein coupling the rearrangeable storage compartment within the rearrangeable storage frame comprises extending a lip of the rearrangeable storage compartment over the bed rail and sliding the rearrangeable storage compartment within the rearrangeable storage frame.

19. The method of claim 12, wherein the rearrangeable bed cover comprises at least one of a fiberglass, a composite plastic, or a fiber reinforced plastic.

* * * * *